April 24, 1934. B. G. ALDRIDGE 1,955,721
METHOD AND APPARATUS FOR DISTILLATION OF OILS
Filed Dec. 1, 1931
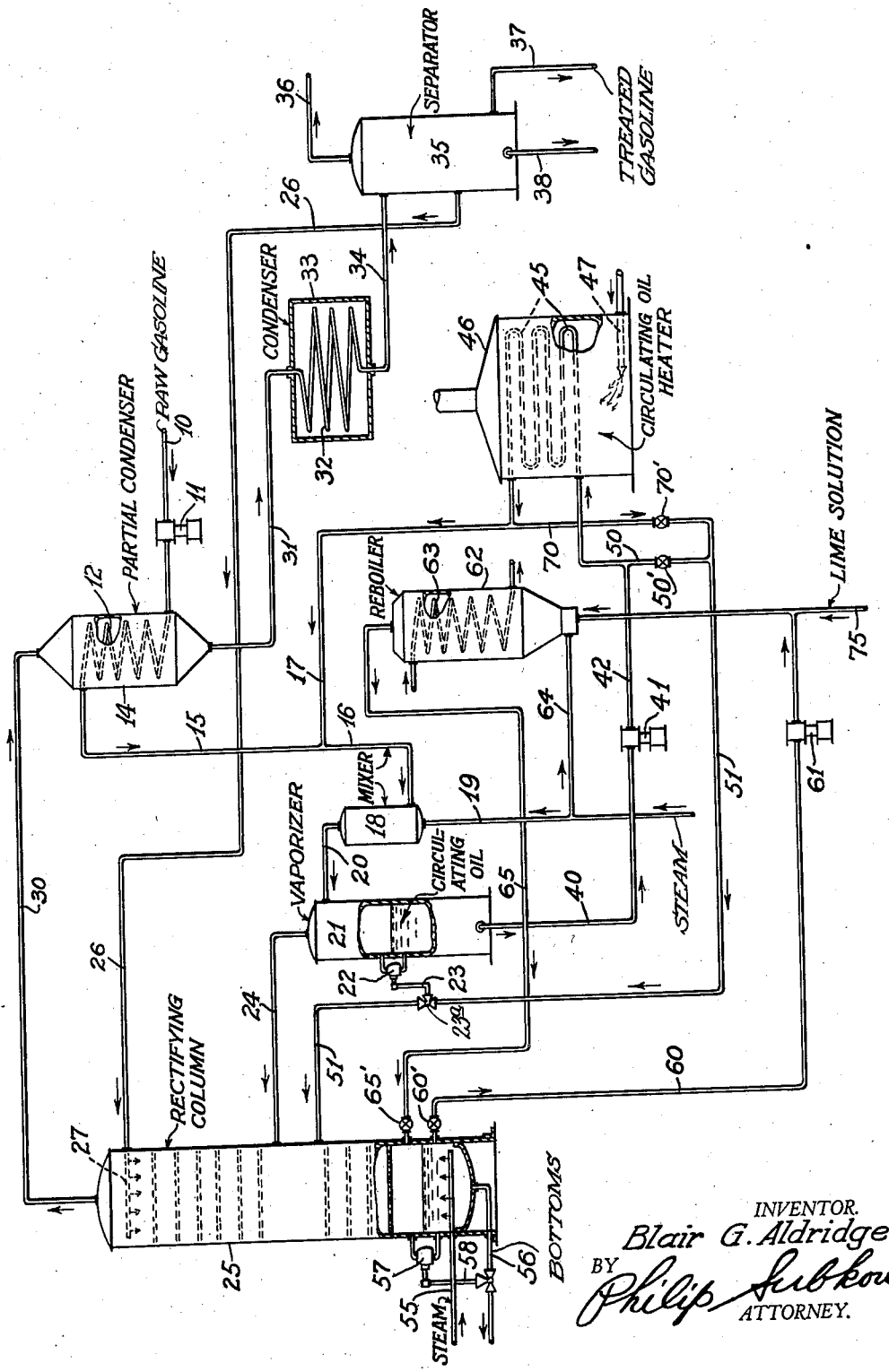
INVENTOR.
Blair G. Aldridge
BY Philip Subkow
ATTORNEY.

Patented Apr. 24, 1934

1,955,721

UNITED STATES PATENT OFFICE 1,955,721

METHOD AND APPARATUS FOR DISTILLATION OF OILS

Blair G. Aldridge, Los Angeles, Calif., assignor to Union Oil Company of California, Los Angeles, Calif., a corporation of California Application December 1, 1931, Serial No. 578,236

9 Claims. (Cl. 196—75)

The present invention relates to a method and apparatus for the distillation of oils. The invention is more particularly directed to a method and apparatus for the redistillation of acid treated synthetic gasoline in order to separate gums and other heavy polymerized products or gum forming constituents from the acid treated product.

It is well recognized that thermal decomposition of petroleum fractions results in the production of a pressure distillate or synthetic gasoline which is highly suitable for use as fuel in internal combustion engines. This decomposition or "cracking", as it is commonly known, results in the production of gums and gum forming constituents, such as diolefines, which are objectionable in the fuel and must be separated. In order to effect their removal, it is common practice to treat the synthetic gasoline with sulphuric acid and thus separate the gums and gum forming material as a sludge. However, the acid treatment is ineffectual to completely separate these objectionable constituents since a portion of their reaction products with the acid is oil soluble and, therefore, not easily separable.

In order to eliminate the oil soluble gums and gum forming constituents remaining in the oil subsequent to the acid treatment, the acid treated product is redistilled to separate approximately 85 to 95% of the treated product as a distillate. The remaining portion or residue constitutes the heavier hydrocarbons and the objectionable gums and gum forming constituents and acid reaction products. This redistillation has in the past been carried out in a shell type still either directly fired or by the introduction of superheated steam. The employment of superheated steam has resulted in objectionable local overheating of the synthetic gasoline due to the high temperatures employed with a consequent production of color forming bodies so that the gasoline thus produced has poor color stabilization characteristics when exposed to sunlight. In some instances, in order to obviate this disadvantage, redistillation has been carried out at relatively low temperatures by the employment of exceedingly large quantities of low temperature steam, and in some instances, 100 lbs. or more of steam per barrel of gasoline must be employed in order to effect a maximum recovery of the gasoline. The objectionable use of large quantities of steam, in some instances, has been corrected by the combined redistillation with a smaller quantity of steam and by heat exchange with heat recovered from other portions of the plant, such as the heat present in the oils by cracking gas oil to produce the synthetic gasoline. Such operation has also been carried out in tubular heat exchangers provided with means for introducing steam. In these cases, substantial improvement in heat economy has resulted, but due to the fact that the heat exchangers are provided with small tubes in order to present sufficient heat transferring surface, this operation has caused considerable trouble due to the plugging of the distillation equipment by the gums and gum forming constituents. This condition is further aggravated by the addition of a neutralizing agent, such as milk of lime, introduced into the distillation equipment for the purpose of counteracting the corrosive action of the acids in the acid treated gasoline.

I have discovered that by employing an oil which is substantially non-volatile at the temperatures employed as a heat transfer medium for the redistillation of the synthetic gasoline, the latter may be redistilled without the objectionable plugging of the distillation equipment. Furthermore, by employing sufficiently large quantities of heat transferring oil in comparison with the oil to be redistilled, the temperature of the heat transfer oil may be sufficiently reduced so that the operation may be carried out at relatively low temperatures. This will prevent formation of unstable products in the gasoline which result in discoloring the gasoline when exposed to sunlight. By employing an oil for this purpose, the gums and gum forming constituents in the gasoline, as well as the bottoms of the gasoline, are retained in the heat transfer oil and the consequent plugging of the distillation equipment is entirely eliminated. By this method, longer continuous operation of the distillation equipment will be obtained without the necessity for shutting down for cleaning. The gums and gum forming constituents are also present in straight run fractions but to a less extent and therefore, this invention is also directed to their removal from these products.

Furthermore, I have obtained a marked efficiency of heat economy and considerable savings in the quantity of steam employed as compared to that required for straight steam distillation.

In one of the preferred embodiments of the present invention, the synthetic gasoline subsequent to its treatment with sulphuric acid for the purpose of removing the major portion of gums and gum forming constituents is mixed with large quantities of a heavier oil which has been heated to a sufficiently high temperature to overcome the latent heat of vaporization and to effect vaporization of the desired constituents or approximately 90 to 95% of the gasoline. Oils that may be employed for this purpose are kerosene or a light gas oil having a boiling range from between 350° F. to 550° F. In practice, I prefer to employ the bottoms of the gasoline produced in the redistillation itself for this purpose. However, for the purpose of starting the distillation process, an oil of the above characteristics may be employed. This will be gradually substituted by the bottoms or heavy ends of the gasoline to be distilled.

The temperature of the circulating oil employed as the heat transfer medium will depend upon the amount mixed with the gasoline to be distilled. This may vary within wide limits. However, the greater the amount admixed with the gasoline, the lower the temperature will be necessary to supply the latent heat of vaporization to the gasoline. It is preferable to provide sufficient amounts of circulating heat transfer medium as to merely supply the latent heat of vaporization of the gasoline. High temperatures of the circulating medium should be avoided in order to prevent material vaporization or cracking of the medium. High circulating rates and lower temperatures are also preferable to prevent local overheating of the oil to be distilled which, as previously stated, will prevent discoloration of the final product.

It is, therefore, an object of this invention to effect redistillation of oils at relatively low temperature by means of large quantities of a heat transfer oil heated to such temperature as will substantially completely vaporize the oil to be distilled, preferably without cracking, mixing the heat transfer oil with the oil to be distilled, separating vapors from the unvaporized oil containing gums and gum forming constituents and rectifying the vapors.

It is a further object to recirculate the unvaporized oil separated from the mixture of vapors and heat transfer oil through a reheating zone and subsequently redistilling further quantities of oil to be distilled with the reheated oil.

It is a more particular object of this invention to provide a process and apparatus for redistillation of acid treated synthetic gasoline containing gums and gum forming constituents which comprises heating an oil of higher gravity than the gasoline to be distilled to a temperature sufficient to vaporize the oil to be distilled, preferably without cracking, upon admixture therewith, mixing this oil with the gasoline to be distilled, separating vapors from the heat transfer oil and unvaporized bottoms of the gasoline containing gums and gum forming constituents, rectifying the vapors thus separated, recirculating the unvaporized oils containing gums and gum forming constituents through a reheating zone, vaporizing further quantities of gasoline to be distilled with the reheated oil and continuously removing a portion of the recirculating oil from the cycle. The invention also includes the feature of removing a portion of the recirculated oil from the recirculating cycle and heating the oil to distill desirable heavy ends of the gasoline which were not vaporized by contact with the heat transfer medium and passing these heavy ends to the rectifying column for admixture with the vapors separated from the gasoline.

Other objects and advantages of this invention will be apparent from the following description of the invention taken from the drawing which shows a schematic arrangement illustrating a preferred embodiment of this invention.

Referring to the drawing, 10 is a line for introducing cold synthetic gasoline into the process. The oil is pumped by pump 11 through coil 12 of partial condenser 14 where it is preheated by heat exchange with rectified gasoline vapors from a rectifying or fractionating column 25. The preheated oil is passed from the partial condenser via line 15 into mixing line 16 where it is contacted and commingled with a heat transfer oil from line 17. If desired, the preheated oil may be passed directly to the mixer without previously contacting it with the heat transfer oil in the line 16. The mixture is subsequently passed into mixer 18 where it is mixed with steam introduced into the mixer via line 19. This mixture is then passed via line 20 into a vaporizer or flash drum 21 wherein a separation of vapors from undistilled oil takes place. The liquid level in vaporizer 21 is controlled by float control 22 which is connected to line 51 by line 23 and valve 23a. Any changes in the liquid level in vaporizer 21 will operate valve 23a and thus regulate the amount or rate of liquid flowing into vaporizer 21. The vapors separated in the vaporizer are passed via line 24 into the rectifying column 25 where they are fractionated with reflux condensate introduced into the column via line 26 and spray 27. The rectified vapors, gases and steam pass from the rectifying column 25 into line 30 and thence into the partial condenser 14 to give up a portion of their heat to the cold synthetic gasoline. The cooled vapors then pass via line 31 into the coil 32 of condenser box 33 and thence via line 34 into a liquid-gas separator 35 provided with a gas outlet 36, a gasoline draw-off 37 and line 38 connected at the bottom thereof for the purpose of withdrawing water condensed from steam. A line 26 also connects with the separator through which a portion of the gasoline may be returned to the top of the rectifying column to serve as cooling medium for the vapors in the rectifying column.

The bottoms from the vaporizer 21 comprising the unvaporized portions of the synthetic gasoline, heat transfer oil and the gums and gum forming constituents separated from the synthetic gasoline are passed into line 40 and pumped by pump 41 into line 42 and thence pass into a reheating coil 45 positioned in furnace 46 and provided with burners 47. While a coil positioned in a furnace is shown, it will be understood that any other form of heating may be employed. For example, this unit may comprise a series of heat exchangers wherein the heating medium may comprise a hot oil from the cracking units. The oil (bottoms) are heated in the furnace to a temperature sufficient to vaporize the synthetic gasoline when contacted therewith and are then passed into line 17 and mixed with preheated synthetic gasoline from line 15. The mixture then is passed into line 16 and to mixer 18.

The heat transfer oil will be continuously increased in amount due to the unvaporized portion of the synthetic gasoline. A portion thereof must be continuously removed from the cycle and, for this purpose, I have provided a by-pass line 50 provided with valve 50' and connected with rectifying column 25 by line 51. A portion of the oil in the bottom of the vaporizer is introduced into the lower or exhausting section of the column for the purpose of stripping the heat transfer oil of the heavy ends of the gasoline which were unvaporized in the vaporizer. Steam may be introduced into the bottom of the column via line 55 to aid in the stripping. The unvaporized liquid, gum and gum forming constituents may be withdrawn from the bottom of the rectifying column via line 56. The rectifying column is also provided with a float control 57 connected with the bottom outlet 56 by line 58.

Instead of by-passing a portion of the recirculating oil to the rectifying colmun via line 50 and valve 50', all of the recirculating oil from the vaporizer 21 may be passed directly through the reheating coil 45 by closing valve 50'. After the oil has been passed through the heating coil 45, a portion may be split and by-passed into line 70 controlled by valve 70' and line 51 and thence to the exhausting section of the column.

In order to provide for heating of the bottoms in the rectifying column, a large quantity of the bottoms may be continuously circulated through a reboiling unit. The bottoms may be removed from the rectifying column via line 60 controlled by valve 60' by pump 61 and passed through the reboiler 62 provided with a heating coil 63 through which a heating medium is circulated for increasing the temperature of the oil. Steam may be also introduced into the reboiler via line 64 to aid in the reboiling. The heated oil is then passed via line 65 controlled by valve 65' into the bottom of the exhausting section of the rectifying column.

In order to prevent corrosion of the equipment, a suitable quantity of alkali, such as a solution of milk of lime, may be introduced into the reboiler via line 75. This solution is mixed with the bottoms from the column passing to the reboiler via line 60. The mixture is reintroduced into the column via line 65. When not employing a reboiler, the lime solution may be introduced into the column 25 by any suitable line not shown.

As a specific example, by way of illustration and without intention of limiting my invention in any manner, I may proceed to operate the process in the following manner:

Approximately 2400 bbls. per day of acid treated synthetic gasoline produced by cracking gas oil or any other petroleum fraction and having a gravity of approximately 55° A. P. I., an end point of 452° F. and containing gums and gum forming constituents are passed into line 10 at a temperature of approximately 67° F. and thence through coil 12 of the partial condenser 14 wherein the feed is preheated to a temperature of approximately 240° F. by heat exchange with vapors at 300° F. from the rectifying column 25. The preheated synthetic gasoline is then passed via line 15 into mixing line 17 where it contacts a heat transfer medium or circulating oil comprising, preferably, the unvaporized bottoms from the synthetic gasoline produced in the vaporizer 21. Approximately 5.5 parts of heat transferring medium at a temperature of 355° F. are admixed with 1 part of synthetic gasoline. This ratio of about 5.5 to 1 and at the temperatures specified is sufficient to vaporize substantially all of the synthetic gasoline. Of course, the temperature of the circulating oil will vary within wide limits depending upon the oil circulating ratio. It is generally understood that the higher the circulating ratio, the lower the temperature of the circulating oil will be to vaporize the same quantity of gasoline. The temperature of the circulating oil for the same amount of vapors distilled may vary from approximately 325° F. to 400° F. when the circulating oil ratio varies from 3 to 8 parts to 1 of the raw gasoline. Above a circulating oil ratio of 8 to 1, the temperature will not be increased appreciably. However, a high circulating oil ratio is preferable since the oil need not be heated to a high temperature in order to vaporize the oil to be distilled. The heat transfer oil should not be heated to temperatures above cracking since cracking will result in the production of fractions which will contaminate the gasoline which has been previously acid treated to remove unstable and colored bodies produced by cracking. Furthermore, the amount of heat transfer oil should be sufficient and its temperature should be sufficiently low as to supply the necessary amount of heat at the proper temperature level and overcome the latent heat of vaporization of the oil to be distilled and without causing any cracking of the oil which, in the example, is a cracked gasoline which has been acid treated to remove the unstable and colored bodies produced by cracking.

The mixture is then passed into the mixer 18 wherein approximately 10 pounds of superheated exhaust steam per barrel of feed and at a temperature of approximately 355° F. is introduced into the bottom of the mixer. The resulting mixture at approximately 322° F. is passed via line 20 into the vaporizer 21. Approximately 90 to 95% of the raw material is vaporized in the vaporizer while the unvaporized portion containing the objectionable gums and gum forming constituents is retained in the circulating oil. The vapors are passed via line 24 into the upper section of the rectifying column 25 and are rectified therein by means of reflux condensate at 75° F., introduced into the column via line 26 and spray 27. This reflux condensate may comprise a portion of the gasoline recovered from the rectifying column. The rectified vapors then pass via line 30 into partial condenser 14 and thence through coil 32 positioned in the water cooled condenser box 33. The vapors condensed in 32 are passed via line 34 into separator 35 wherein the fixed gases are separated and passed via line 36 while the gasoline is removed via line 37 and water via line 38.

The bottoms of the vaporizer comprising the heat transfer oil and unvaporized portions of the gasoline containing all of the gums and gum forming constituents are withdrawn via line 40 and are continuously recirculated by means of pump 41 and line 42 into the heating coil 45 of furnace 46 and thence back into line 17 to contact further quantities of raw material. It is thus seen that cyclic circulation of heat transferring oil is maintained from the vaporizer through the heating coil and back to the mixer and vaporizer.

In view of the fact that the circulating oil is continuously being increased to the extent of approximately 5 to 10% due to unvaporized oil from the synthetic gasoline, a portion must continuously be bled out of the system. For this purpose, one may proceed by either of two alternative methods. By opening valve 50' and closing valve 70', a portion of the circulating oil approximating 5 to 10% of the raw materials may be passed via lines 50 and 51 into the exhausting section of the rectifying column 25. Steam is introduced via line 55 into the oil in order to aid in the distillation of desirable heavy ends of the gasoline unvaporized in the vaporizer. The bottoms in the column comprising the heavy ends of the raw gasoline and containing gums and gum forming constituents and amounting to approximately 5 to 10% of the raw material are withdrawn via line 56. If desired, however, valve 50' may be closed and valve 70' opened and thus all of the recirculating oil may be passed through the heating coil 45 wherein it is heated to a temperature of 355° F. and thence passed into line 17. A portion of the heated oil may then be by-passed via line 70 into line 51 and thence passed to the exhausting section of the column.

In order to further aid in stripping the bottoms of heavy ends of the gasoline, a large quantity of the bottoms approximating the ratio of 19 to 1 of the quantity of bottoms produced in the rectifier and at a temperature of approximately 350° F. are withdrawn from the rectifier and are cyclically pumped via line 60 through the reboiler 62 where they are heated to a temperature of approximately 355° F. by heating fluid circulated through coil 63. Superheated exhaust steam to the extent of 10 pounds per barrel of raw material is introduced via line 64 to aid in the reboiling. This oil is then passed via line 65 into the exhausting section of the column. When employing the reboiler unit, it is not necessary to introduce steam via line 55 into the exhausting section of the column if sufficient amount has been introduced into the reboiler.

The amount of steam to the mixer 18 and the reboiler 62 is given as approximately 10 pounds per barrel of raw material in each unit. In practice, I have found that the total quantity of steam employed in the process need not exceed 20 pounds per barrel of raw material. This amount is far less than that required in the redistillation when not employing a heat transfer medium.

The amount of steam may be proportioned between the reboiler and mixer in any desired manner. I have shown the same as being equally proportioned. However, it is preferable to employ more steam in the reboiler and/or in the bottom of the exhausting column than in the mixer for the reason that a higher steam rate on the heavy ends will aid in improving the color characteristics of the finished gasoline.

The product obtained was a gasoline of very stable color characteristics and having a gravity of approximately 57° A. P. I. and an end point of 420° F.

The above disclosure is to be taken merely as illustrative of a preferred embodiment of my invention and is not to be considered limiting, since many variations thereof may be made within the scope of the following claims.

I claim:

1. A method of distilling oil which comprises heating one oil to a temperature sufficient to supply latent heat of vaporization of at least a portion of a second oil to be distilled, said temperature being insufficient to materially vaporize or crack said first mentioned oil, commingling said first mentioned oil with said second oil, separating vapors from liquid oils, reheating said separated liquid oils, vaporizing further quantities of said second mentioned oil with said reheated liquid oil, withdrawing a portion of said separated liquid oils and partially vaporizing a portion of said withdrawn oil and commingling the vapors with said first mentioned vapors.

2. A method of distilling gasoline containing gums and gum forming constituents which comprises heating an oil to a temperature sufficient to supply latent heat of vaporization of at least a portion of gasoline to be distilled, said temperature being insufficient to materially vaporize or crack said first mentioned oil, commingling said first mentioned oil with said gasoline, separating vapors from the mixture of the first mentioned oil and the unvaporized portion of said gasoline containing gums and gum forming constituents of said gasoline, reheating said separated oil and unvaporized gasoline to the above mentioned temperature and vaporizing further quantities of said gasoline by commingling said reheated oil and unvaporized gasoline with additional gasoline, withdrawing a portion of said separated liquid oil and unvaporized gasoline containing gums and gum forming constituents from said reheating and vaporization and vaporizing heavy ends of said gasoline from said withdrawn liquid oil and unvaporized gasoline, commingling said heavy ends with said first mentioned vapors, and withdrawing the unvaporized liquid oil remaining after vaporization of said heavy ends.

3. A method of distilling gasoline containing gum forming constituents which comprises heating an oil to a temperature sufficient to supply latent heat of vaporization of approximately 90 to 95% of gasoline to be distilled, said temperature being insufficient to materially vaporize or crack said first mentioned oil, commingling said heated oil with said gasoline, separating vapors from said gasoline in amounts of approximately 90 to 95% of said gasoline from the mixture of the first mentioned oil and unvaporized portion of said gasoline containing gums and gum forming constituents of said gasoline, rectifying said vapors to produce an oil free from gums and gum forming constituents, reheating said separated oil and unvaporized gasoline to the above mentioned temperature and vaporizing further quantities of gasoline by commingling said reheated oil and unvaporized gasoline with additional gasoline, withdrawing a portion of said separated oil and unvaporized gasoline containing gums and gum forming constituents from said heating and vaporization, vaporizing heavy ends of said gasoline contained in said withdrawn liquid oil and unvaporized gasoline and commingling said heavy ends with said first mentioned vapors and withdrawing the unvaporized liquid oil remaining after vaporization of said heavy ends.

4. A method of distilling gasoline containing gums and gum forming constituents which comprises heating an oil to a temperature sufficient to supply latent heat of vaporization of approximately 90 to 95% of gasoline to be distilled, said temperature being insufficient to materially vaporize or crack said first mentioned oil, commingling said heated oil with said gasoline, separating vapors from said gasoline in amounts of approximately 90 to 95% of said gasoline from the mixture of the first mentioned oil and unvaporized portion of said gasoline containing gums and gum forming constituents of said gasoline, rectifying said vapors to produce an oil free from gums and gum forming constituents, reheating said separated oil and unvaporized gasoline to the above mentioned temperature, and vaporizing further quantities of gasoline by commingling said reheated oil and unvaporized gasoline with additional gasoline, withdrawing a portion of said separated oil and unvaporized gasoline containing gums and gum forming constituents from said heating and vaporization, mixing said separated liquid oils with steam in amounts and at a temperature sufficient to vaporize heavy ends of said withdrawn liquid oil and unvaporized gasoline and at a temperature insufficient to materially crack said heavy ends, separating vapors of said heavy ends from said mixture and commingling said heavy ends with said first mentioned vapors and withdrawing the unvaporized liquid oil remaining after vaporization of said heavy ends.

5. A method of distilling gasoline containing gums and gum forming constituents which comprises heating an oil to a temperature approximating 325–400° F., commingling approximately 3 to 8 parts of said heated oil with 1 part of gasoline preheated to a temperature of approximately 240° F, separating vapors of approximately 90 to 95% of said gasoline from the mixture of the first mentioned oil and unvaporized portion of said gasoline containing gums and gum forming constituents of said gasoline, rectifying said vapors, reheating separated oil and unvaporized gasoline to the above mentioned temperature and vaporizing further quantities of gasoline by commingling said reheated oil and unvaporized gasoline with additional gasoline, withdrawing a portion of said separated oil and unvaporized gasoline containing gums and gum forming constituents from said heating and vaporization, commingling said separated oils with sufficient quantities of steam at a temperature to heat said withdrawn oil to approximately 355° F., separating vapors from said withdrawn oil and commingling said separated vapors with said first mentioned vapors and withdrawing the unvaporized liquid oil remaining after vaporization of said heavy ends.

6. An apparatus for distilling oil comprising a heater, a mixer, a vaporizer and a rectifier, means for circulating oil from said heater to said mixer and into said vaporizer, and means for circulating liquid oil from said vaporizer to said heater, means for introducing oil to be distilled into said mixer, a line connecting said rectifier with said vaporizer, means for withdrawing a portion of said liquid oil circulating from said heater to said vaporizer and back to said heater, means for stripping a portion of said withdrawn oil, means for commingling the stripped vapors with the vapors from said first mentioned vaporizer.

7. An apparatus for distilling oil comprising a heater, a mixer, a vaporizer and a rectifier, means for circulating oil from said heater to said mixer, vaporizer and back to said heater, means for introducing oil to be distilled into said mixer, a line connecting said vaporizer with said rectifier, means for withdrawing a portion of said oil circulating from said heater to said mixer at a point intermediate said heater and mixer, means for introducing said withdrawn oil into said rectifier and means for withdrawing unvaporized oil from said rectifier.

8. An apparatus for distilling oil comprising a heater, a mixer, a vaporizer and a rectifier, means for circulating oil from said heater to said mixer, vaporizer and back to said heater, means for introducing oil to be distilled into said mixer, a line connecting said vaporizer with said rectifier, means for withdrawing a portion of said oil circulating from said heater to said mixer at a point intermediate said heater and mixer, means for introducing said withdrawn oil into said rectifier, a reboiler, means for circulating oil from said rectifier through said reboiler and back to said rectifier and means for withdrawing unvaporized oil from the bottom of said rectifier.

9. A method of distilling oil which comprises circulating oil in a closed ring including a heater and a vaporizer, heating said oil in said heater to a temperature sufficient to supply latent heat of vaporization of at least a portion of a second oil to be distilled, said temperature being insufficient to materially vaporize or crack said first mentioned oil, introducing a second oil into said ring intermediate said heater and said vaporizer, passing said mixture of first mentioned heated oil and said second oil to said vaporizer, separating vapors from liquid oils in said vaporizer, passing a portion of said liquid oils to said heater, withdrawing another portion of said liquid oils from said closed ring and vaporizing a portion of said withdrawn oils and commingling the vapors with said first mentioned vapors.

BLAIR G. ALDRIDGE.